United States Patent Office 2,777,834
Patented Jan. 15, 1957

2,777,834

COPOLYMERIZATION OF VINYL CHLORIDE WITH VINYLIDENE CHLOROFLUORIDE AT HIGH PRESSURES

John D. Calfee, Dayton, Ohio, assignor to Monsanto Chemical Company, St. Louis, Mo., a corporation of Delaware No Drawing. Application November 22, 1952, Serial No. 322,158

5 Claims. (Cl. 260—87.7)

This invention relates to the copolymerization of vinyl chloride with 1-chloro-1-fluoroethylene (the latter is commonly termed vinylidene chlorofluoride). In one aspect the invention pertains to the copolymerization of vinyl chloride with vinylidene chlorofluoride by an improved method resulting in the production of homogeneous high molecular weight polymer product. In another aspect the invention relates to the production of vinyl chloride-vinylidene chlorofluoride copolymers which are compatible with polyinvyl chloride.

Copolymers of vinyl chloride with 1-chloro-1-fluoro-ethylene are taught and claimed in U. S. Patent No. 2,328,510 to Charles Allen Thomas. The present invention is a specific improvement in the polymerization process described therein. When a mixture of vinyl chloride and vinylidene chlorofluoride is subjected to copolymerization at autogenous pressure, i. e., at the vapor pressure of the monomeric mixture at the temperature at which polymerization is being effected, the resulting product has certain properties which could desirably be improved upon. This is particularly true when fairly high total conversion of the monomeric material to polymer is effected, and these problems are accentuated when the monomeric material contains above about 35 weight percent vinylidene chlorofluoride. Generally speaking, copolymers of vinylidene chlorofluoride with vinyl chloride made by polymerization at autogenous pressures, which are well below 1000 pounds per square inch and often in the neighborhood of 200 pounds per square inch, tend to be non-homogeneous in nature, and particularly when the polymerization is carried to a high conversion. The polymerization is slow, the catalyst efficiency is low, and a colored product is often formed. Further, it would be desirable to be able to blend vinyl chloride-vinylidene chlorofluoride copolymer with polyvinyl chloride, but the copolymer made at ordinary pressures is not compatible with polyvinyl chloride. It will be appreciated that limiting the conversion to a low value in order to overcome some of these problems is economically undesirable inasmuch as unreated monomers must be recovered and then returned for further reaction.

An object of this invention is to produce improved copolymers of vinyl chloride with vinylidene chlorofluoride. Another object of the invention is to provide polymerization conditions resulting in copolymerization of vinyl chloride with vinylidene chlorofluoride with very small quantities of catalyst and shorter reaction times than heretofore known. A further object is to provide an improved vinyl chloride-vinylidene chlorofluoride copolymerization process which results in a resinous product compatible with polyvinyl chloride resins. Another object is to produce a copolymer of vinyl chloride with vinylidene chlorofluoride which is homogeneous. A further object is to effect copolymerization of vinyl chloride with vinylidene chlorofluoride under conditions producing a resin of high molecular weight. Further objects and advantages of the invention will be apparent, to those skilled in the art, from the accompanying disclosure and discussion.

In accordance with my invention in preferred embodiments, one or more of the foregoing objects are attained by effecting the copolymerization of a mixture of vinyl chloride and 1-chloro-1-fluoroethylene at extremely high pressures of at least 5,000 pounds per square inch, and preferably at least 20,000 pounds per square inch. Though some of the benefits of the invention are obtained by operating at pressures in the neighborhood of 5,000 pounds per square inch, it is much preferred to employ pressures above 20,000 pounds per square inch in order to overcome most of the difficulties mentioned herein. I have found that pressures of 40,000 pounds per square inch and higher are particularly suitable for giving high conversions, low color, high homogeneity, compatibility with polyvinyl chloride, and short reaction times with only a small quantity of catalyst. There is no particular upper pressure limit except that imposed by equipment limitations, and pressures up to 200,000 pounds per square inch and even higher are suitable.

Any temperature giving a reasonable reaction rate is permissible, but temperatures within the range of 0 to 125° C. are most often used, especially since temperatures higher than 125° C. tend to result in decomposition of the monomers and/or product. A temperature within the range of 40° C. to 100° C. is preferred.

The invention is applicable to mixtures of vinyl chloride with vinylidene chlorofluoride in all proportions, such as from 5 to 95 weight percent vinyl chloride and from 95 to 5 weight percent vinylidene chlorofluoride, based upon the combined weights of the monomers. Preferably the monomers are highly purified, as the presence of reactive impurities, particularly oxygen-containing and sulfur-containing compounds, and acetylene, may tend to retard the reaction and/or adversely affect the products. It is not beyond the broadest scope of the invention to include in the polymerizing mixture minor quantities of other unsaturated copolymerizable organic compounds provided any desirable properties attributable to the presence of such additional compounds are not overshadowed by changes in the characteristics of the polymer so that it no longer is essentially a vinyl chloride-vinylidene chlorofluoride copolymer.

As indicated hereinabove, reaction times are much shorter when practicing my invention than when copolymerizing vinyl chloride with vinylidene chlorofluoride at ordinary pressures. Those skilled in the art will of course appreciate that reaction time is one variable which is interdependent with other reaction variables, particularly pressure, catalyst, amount of catalyst, purity of monomer, proportions of the monomers, the presence or absence of added reaction media, and whether the reaction is a batch or continuous one. In some instances, it may be desired to employ a reaction time of several days, but ordinarily a reaction time not in excess of 24 hours is fully satisfactory. For a batch reaction, reaction times of 2 to 20 hours are preferred. For continuous reaction, reaction times are ordinarily much shorter, and they range in a continuous flow system from a few minutes up to a few hours, for example from 5 minutes to 5 hours. The copolymerization of vinyl chloride with vinylidene chlorofluoride can be effected in accordance with my invention in reaction mixtures consisting solely of vinyl chloride, vinylidene chlorofluoride and catalyst. However, the copolymerization can also be carried out in the presence of added reaction media, for example gaseous or liquid carrying fluids, e. g., water, or organic liquids which may or may not have a solvent action on the polymeric product, e. g., acetone, benzene, xylene, cyclohexanone, dioxane, methyl ethyl ketone. The use of added non-reacting fluid reaction media is particularly useful in a continuous flow process. When water is used as an added reaction medium, it is permissible to employ additionally suspending and/or emulsifying agents in small amounts which aid in the suspension or actual emulsification of the monomers and polymer product in the water. Whether or not such materials are used, vigorous agitation is useful when employing water as a reaction medium, e. g., as by stirring in a batch reactor or by use of turbulent flow conditions in a continuous flow polymerization. Liquid reaction media assist in controlling the reaction temperature, since the polymerization is highly exothermic. Suitable proportions of water are, for example from 0.5 to 5 parts by weight per part of monomeric material. If a solvent or non-solvent liquid organic reaction or carrying medium is to be used, ordinarily at least 1 part by weight per part of monomeric material up to 5 or 10 parts of the former will be suitable. It will be understood that suitable precautions should be observed in effecting this process, including the use of rupture disks, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures required by the invention are no barriers to the commercial use of the invention.

Sufficient catalyst should be employed to give a reasonable reaction rate. Suitable catalysts are of the free radical promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula R'OOR" wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include: benzoyl peroxide, tertiary butyl peroxide, tertiary butyl hydroperoxide, diacetyl peroxide, diethyl peroxycarbonate, dimethylphenyl hydroperoxymethane (also known as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N—; the dangling valences can be attached to a wide variety of organic radicals, at least one, however, preferably being attached to a tertiary carbon atom. By way of example of suitable azo-type catalysts can be mentioned $\alpha,\alpha'$-azodiisobutyronitrile, diazoaminobenzene, and azobis(diphenylmethane). The peroxy-type or azo-type polymerization catalyst is used in small but catalytic amounts, which are generally not in excess of 1 percent by weight based upon the monomeric mixture. A suitable quantity is often in the range of 0.001 to 0.5 percent by weight.

The properties of the copolymers produced in accordance with this invention are dependent to a considerable extent not only upon the particular combination of reaction conditions employed but also upon the proportions of vinyl chloride to vinylidene chlorofluoride in the monomeric material. Thus, when the monomer is largely vinyl chloride with only a small amount of vinylidene chlorofluoride, the latter serves to lower the softening point and increase the ductility of the resulting product which, however is largely similar to polyvinyl chloride prepared at the same conditions. Increasing proportions of vinylidene chlorofluoride result in increased tensile elongation, and lowered softening and melting temperatures, the product becoming more rubbery in nature as the proportion of vinylidene chlorofluoride increases, especially above 50 weight percent of the total monomeric material. Polymers prepared in accordance with this invention are homogeneous or self-compatible over the entire range of proportions of the two comonomers and are generally compatible with polyvinyl chloride.

Copolymers made in accordance with the present invention can be subjected to conventional injection molding and compression molding operations, can be cast as films from solvent by known techniques, can be extruded into various forms including extrusion in the form of fibers or films into a non-solvent or into a gas effecting evaporation of solvent or can be extruded in the absence of any solvent. Some of the copolymers made in accordance with the invention are particularly valuable in making films by the inflated balloon technique. The polymer can be worked on mills alone or in admixture with other plastic materials in known manner. Plasticizers, modifiers, fillers, stabilizers, pigments and the like can be incorporated in copolymers made in accordance with this invention. The copolymers of the present invention are not inflammable.

EXAMPLES

The following data are presented by way of example to illustrate some of the preferred methods of carrying out the invention and properties of product so produced. The data also provide a comparison with copolymers made at low pressures. It will be appreciated that the data are merely exemplary in nature and are not to be taken to limit the invention unduly.

The data are organized in Tables I and II. The polymerizations were all effected in bomb reactors, in a batchwise manner, the combination of reaction conditions employed being described in each case in the table. Runs A, C, E and F were carried out in accordance with the invention. Run D was carried out at the autogenous pressure of the monomeric mixture and Run B was carried out slightly below 1,000 pounds per square inch but above the autogenous pressure, and are presented for comparison purposes.

The thermal properties, i. e., softening point, melting point, decomposition point and etching point, of the polymers as set forth in Table I, were determined by the following test procedure.

Copper bar thermal properties

This is an adaptation of the Maquenne block test, performed on a copper bar in the manner of Dennis and Shelton, Jour. Amer. Chem. Soc. 52, 3128 (1930); see "The Chemistry of Synthetic Resins," vol. II, Carleton Ellis, Reinhold Publishing Corp., 1935, page 1264. The test is performed on a copper bar which is heated at one end and cooled at the other, thus forming a surface whose temperature varies along the bar between these extremes. Thermometers are mounted in the bar at intervals to determine the temperature of the individual parts. Small particles of the polymer to be tested are sprinkled in a thin layer along the bar. After ten minutes the following observations are made.

*S. P.—Softening point.*—This is determined by brushing the same with a bristle from a paint brush. The lowest temperature at which the sample just begins to stick to the bar is taken as the softening point.

*M. P.—Melting point.*—The lowest temperature at which the particles begin to lose their shape is taken as the melting point.

*D. P.—Decomposition point.*—The lowest temperature at which discoloration begins, either of the particles or of the melted material, is taken as the decomposition point.

*E. P.—Etch point.*—The lowest temperature at which the sample begins to attack the copper bar is taken as the etch point.

weight percent 1-chloro-1-fluoroethylene to copolymerization at a pressure of at least 20,000 pounds per square inch for a time sufficient to convert more than 60 weight

Table I
COPOLYMERIZATION OF VINYL CHLORIDE WITH VINYLIDENE CHLOROFLUORIDE

| Run No. | Monomer | Grams | Percent Porofor[1] Catalyst | Time, Hrs. | Temp., °C. | Pressure, p. s. i. | Yield, percent | Tensile Properties | | Specific Viscosity, 0.1% in DMF[2] | Copper Bar Thermal Properties, °C. | | | |
|---|---|---|---|---|---|---|---|---|---|---|---|---|---|---|
| | | | | | | | | Tensile, lbs./in.$^2$ | Elongation, percent | | S. P. | M. P. | D. P. | E. P. |
| A | VCl / VCF | 65 / 20 | 0.01 | 16 | 55 | 40,000 | 90 | 6,250 | 66 | 0.083 | 175 | 205 | 210 | 230 |
| B | VCl / VCF | 65 / 20 | 0.05 | 96 | 55 | <1,000 | 80 | 3,930 | 25 | 0.058 | 165 | 180 | 200 | 215 |
| C | VCl / VCF | 70 / 30 | 0.02 | | 55 | 35,000 | | | | | | | | |
| D | VCl / VCF | 50 / 50 | 0.1 | 60 | 44 | Autogenous >150 | 40 | 2,310 | 275 | | | | | |
| E | VCl / VCF | 42 / 42 | 0.012 | 16 | 55 | 40,000 | 75 | 3,870 | 330 | | 155 | 185 | 215 | 220 |
| F | VCl / VCF | 25 / 43 | 0.007 | 19 | 55 | 40,000 | 90 | 2,260 | 288 | | 120 | 165 | 205 | 205 |

[1] Porofor is $\alpha,\alpha'$-azodiisobutyronitrile.
[2] Dimethyl formamide.

VCl indicates vinyl chloride.
VCF indicates vinylidene chlorofluoride.
S. P. indicates softening point.
M. P. indicates melting point.
D. P. indicates decomposition point.
E. P. indicates etching point.

Table II
OBSERVATIONS ON RUNS REPORTED IN TABLE I

| Run No. | |
|---|---|
| A | Polymer homogeneous, colorless, compatible with polyvinyl chloride. Note: high conversion, small catalyst requirement. Compare with Run B. |
| B | Compare with Run A. Note: lower molecular weight, longer reaction time, higher catalyst requirement, poorer physical properties. Material less compatible with polyvinyl chloride. |
| C | Explosive reaction. Catalyst concentration too high for pressure employed. |
| D | Product fairly clear due to moderate conversion. Color-free due to low reaction temperature. |
| E | Compare with Run D. Note: improved properties despite higher reaction temperature and increased conversion, shorter polymerization time, low catalyst requirement. Polymer clear and self-compatible despite high yield and high vinylidene chlorofluoride content. Product much more compatible with polyvinyl chloride than was product of Run D. |
| F | Self-compatible. Product resembles vinylidene chlorofluoride homopolymer more nearly than in other runs. Note: low catalyst requirement and high conversion. |

This application is related to my copending application, Serial No. 322,157, filed November 22, 1952, which is directed to the homopolymerization of 1-chloro-1-fluoroethylene at high pressures.

This invention has been described with particular reference to various preferred embodiments thereof. It is to be understood that variations from the specific details can be made without departing from the invention.

I claim:
1. A method of making self-compatible homogeneous high molecular weight copolymers of vinyl chloride with 1-chloro-1-fluoroethylene, which comprises subjecting a monomeric material comprising from about 65 to about 5 weight percent vinyl chloride and from about 35 to 95 percent of the monomeric material to a normally solid homogeneous high molecular weight copolymer.

2. A process which comprises copolymerizing a monomeric material consisting of from about 65 to about 5 weight percent vinyl chloride and from about 35 to about 95 weight percent 1-chloro-1-fluoroethylene at conditions including a pressure of at least 40,000 pounds per square inch producing, in a yield of more than 60 weight percent, a solid copolymer of vinyl chloride and 1-chloro-1-fluoroethylene having, in comparison with copolymer produced at autogenous pressure of said monomeric material, increased clarity, homogeneity, molecular weight, and compatibility with polyvinyl chloride.

3. A process which comprises copolymerizing a monomeric material comprising from about 65 to 5 weight percent vinyl chloride and from about 35 to about 95 weight percent 1-chloro-1-fluoroethylene at a pressure of at least 20,000 pounds per square inch and a temperature of from 40 to 100° C. in the presence of small but catalytically effective amounts of a catalyst selected from the group consisting of azo and peroxy polymerization catalysts, for a time sufficient to convert more than 60 weight percent of the monomeric material to a normally solid homogenous high molecular weight copolymer.

4. A process according to claim 3 wherein said catalyst is $\alpha,\alpha'$-azodiisobutyronitrile.

5. A process according to claim 3, wherein from 0.005 to 0.5 weight percent of said catalyst is employed.

References Cited in the file of this patent
UNITED STATES PATENTS

| 1,952,116 | Bridgman et al. | Mar. 27, 1934 |
| 2,328,510 | Thomas | Aug. 31, 1943 |
| 2,471,959 | Hunt | May 31, 1949 |
| 2,479,367 | Joyce et al. | Aug. 16, 1949 |

UNITED STATES PATENT OFFICE
CERTIFICATE OF CORRECTION

Patent No. 2,777,834                                                       January 15, 1957

John D. Calfee

It is hereby certified that error appears in the printed specification of the above numbered patent requiring correction and that the said Letters Patent should read as corrected below.

Column 4, line 64, for "same" read -- sample --; column 6, line 44, for "to 5" read -- to about 5 --.

Signed and sealed this 6th day of August 1957.

(SEAL)
Attest:

KARL H. AXLINE
Attesting Officer

ROBERT C. WATSON
Commissioner of Patents